United States Patent [19]

Duval et al.

[11] Patent Number: 5,227,264
[45] Date of Patent: Jul. 13, 1993

[54] DEVICE FOR PACKAGING A LITHIUM BATTERY

[75] Inventors: Michel Duval, Montréal; Yves Giguere, Ste-Julie, both of Canada

[73] Assignee: Hydro-Quebec, Montreal, Canada

[21] Appl. No.: 655,092

[22] Filed: Feb. 14, 1991

[51] Int. Cl.$^5$ .............................................. H01M 6/46
[52] U.S. Cl. ...................................... 429/153; 29/730; 429/152; 429/162; 429/163; 429/178; 429/185; 429/192
[58] Field of Search ................... 29/730; 429/152, 153, 429/162, 163, 178, 185, 192

[56] References Cited

U.S. PATENT DOCUMENTS

| | | | |
|---|---|---|---|
| 4,145,485 | 3/1979 | Kinsman | 429/152 |
| 4,374,186 | 2/1983 | McCartney et al. | 429/162 |
| 4,457,991 | 7/1984 | Feldhake | 428/185 |
| 4,517,265 | 5/1985 | Bélanger et al. | 429/217 |
| 4,652,506 | 3/1987 | Bélanger et al. | 429/192 |
| 4,690,840 | 9/1987 | Gauthier et al. | 427/436 |
| 4,759,771 | 7/1988 | Morra | 429/162 |
| 4,830,936 | 5/1989 | Planchat et al. | 429/153 |
| 4,997,732 | 3/1991 | Austin et al. | 429/153 |
| 5,057,385 | 10/1991 | Hope et al. | 429/163 |

Primary Examiner—Mark L. Bell
Assistant Examiner—Willie J. Thompson
Attorney, Agent, or Firm—Oblon, Spivak, McClelland, Maier & Neustadt

[57] ABSTRACT

Two metallic foils each have a continuous band of polyethylene film adhesively bonded thereto. The lithium battery is sandwiched between these two metallic foils and a thermo-seal is provided to join the two polyethylene films. This construction prevents any outside substance from contacting the lithium battery.

23 Claims, 2 Drawing Sheets

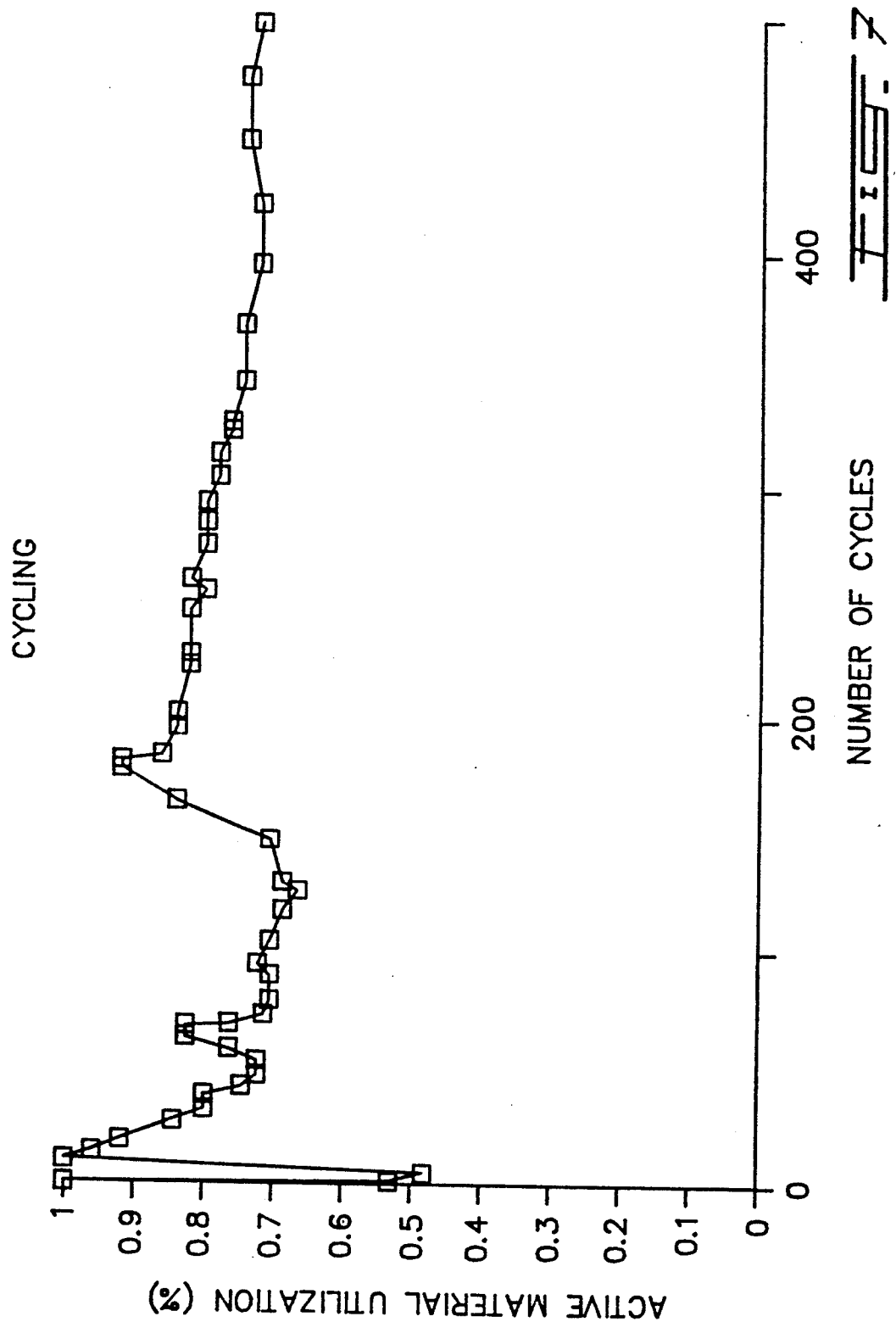

DEVICE FOR PACKAGING A LITHIUM BATTERY

BACKGROUND OF INVENTION (a) Field of the Invention

The present invention relates to a device for packaging at least one lithium battery and a method of producing same. More particularly, the present invention is directed to thermosealable packagings for lithium batteries which include a solid polymer electrolyte which is in electrical contact with an anode of lithium or lithium alloy and a cathode containing at least one metallic salt, such as $V_6O_{13}$, $TiS_2$ or the like.

(b) Description of Prior Art

Lithium or lithium alloy batteries involving the use of a solid polymer electrolyte are known as disclosed for example in the following U.S. Pat. Nos.:

| 4,517,265 | May 14, 1985 |
| 4,652,506 | March 24, 1987 |
| 4,690,840 | September 1, 1987 |

JP 1-239759 dated Sep. 25, 1989 by Hitachi-Maxell discloses a sealing material for batteries of the above type which comprises a hot melt bond of dehydro malonic acid which is heat sealed at 200° C.

JP 62-64065 dated Mar. 20, 1987 by Hitachi discloses the use of glass films which are laser beam welded.

JP 61-277151 dated Dec. 8, 1986 by Dai Nippon discloses the use of copolymers of ethylene and acrylic acid containing acetoxyl radicals.

JP 61-248358 dated Nov. 5, 1986, JP 61-185867 dated Aug. 19, 1986, JP 61-74256 dated Apr. 16, 1986 and JP 61-68860 dated Apr. 9, 1986, all by SEIKO disclose the use of copolymers of ethylene and tetrafluoroethylene which are heat sealed at 280° C.

JP 1-239759 and JP 61-277151 use partially hydrophilic polar polymers, which do not provide sufficient humidity resistance. The sealing materials of the Hitachi-Maxell, DAI NIPPON and SEIKO references do not perfectly adhere to metals and have only limited resistance to peeling. The sealing material of HITACHI is susceptible to cracking.

All in all, the sealing materials of the prior art run the risk of delamination and leaking and because of a relatively high heat-sealing temperature in all cases, there is a risk of damage to the heat sensitive battery.

SUMMARY OF INVENTION

In accordance with the invention, there is provided a device for packaging at least one lithium battery, the lithium battery including a solid polymer electrolyte in electrical contact with an anode of lithium or a lithium alloy and a cathode containing at least one metallic salt. The device comprises a first metallic foil having a first continuous band of plastic foil adhesively bonded thereto along the entire peripheral edges of the first metallic foil, a second metallic foil having a second continuous band of plastic foil adhesively bonded thereto along the entire peripheral edges of the second metallic foil, the first and second metallic foils being disposed over one another with the first and second plastic foils arranged adjacent one another in facing relationship, the lithium battery being sandwiched between the first and second metallic foils in the space inside the first and second continuous bands of plastic film with the anode in contact with one metallic foil and the cathode in contact with the other metallic foil, the first and second continuous bands of plastic film being imperviously sealed together to prevent any outside substance to contact the battery.

In accordance with a preferred embodiment of the invention, the metallic foils are made of the same material, which is preferably stainless steel, nickel, copper, aluminum, or alloys thereof. The most preferred metallic foils are made of stainless steel.

Generally, the metallic foils have a thickness between $8\mu$ and $50\mu$. When the metallic foils are made of stainless steel, they usually have a thickness between $9\mu$ and $12\mu$. When they are made of nickel, they generally have a thickness of about $9\mu$. When they are made of aluminum, their thickness is generally about $25\mu$. Thicker metallic sheets with a flat uniform surface may also be used instead of metallic foils.

In accordance with a preferred embodiment, the first and second metallic foils are in the form of flat rectangular foils, although they may be of any suitable shape, such as round.

In accordance with another preferred embodiment of the invention, at least the second metallic foil is shaped as a container with a peripheral flange at the open part thereof, the second continuous band being adhesively bonded to the entire peripheral flange.

Possibly, both first and second metallic foils are shaped as a container with a peripheral flange.

In accordance with another embodiment of the invention, the first metallic foil is shaped as a shallow container with a peripheral first collar, the second metallic foil is shaped as a deeper container with a longer second collar, the deeper container being adapted to receiving the shallow container in the upper portion thereof. The first continuous band is adhesively bonded along the upper edge outside the first collar and the second continuous band is adhesively bonded along the upper edge inside the second collar.

The first and second continuous bands of plastic film are preferably made of laminating grade polyethylene although any other suitable plastic material may be used. The preferred material has been found to be a high density polyethylene, such as DuPont HDPE.

In accordance with another preferred embodiment of the invention, the film of laminating grade polyethylene is corona treated on one surface thereof. The polyethylene film has a preferred thickness between about $25\mu$ and $100\mu$, preferably about $50\mu$.

The polyethylene film is preferably bonded to the metallic foil by means of a two part polyester glue, such as a glue sold by Morton Thiokol under the trademark ADCOTE 548. The adhesive bond has a preferred thickness of about $5\mu$ to $25\mu$ after setting, most preferably about $10\mu$.

Normally, the corona treated surface faces the corresponding metallic foil, and the adhesive bond is formed between the corona treated surface and the metallic foil.

In accordance with another preferred embodiment of the invention, the first metallic foil and the first continuous band have a slightly smaller surface area than the second metallic foil and second continuous band so as to prevent any possible electrical contact between the first and second metallic foils when the device is assembled. Under well-controlled conditions of assembling and heat-sealing, however, identical surface area can also be used.

In accordance with another embodiment of the invention, there is provided a method for packaging at least one lithium battery which comprises providing at least one lithium battery including a solid polymer electrolyte in electrical contact with an anode of lithium or a lithium alloy and a cathode containing at least one metallic salt, providing first and second metallic foils and first and second continuous bands of plastic film, each band of plastic film having a corona treated surface, depositing on the metallic foils or continuous bands of plastic film a layer of an adhesive capable of producing an impervious seal respectively between the first metallic foil and the corona side of the first continuous band of plastic film and between the second metallic foil and corona side of the second continuous band of plastic film, separately laminating the first metallic foil with the first continuous band of plastic film, and the second metallic foil with the second continuous band of plastic film to spread the adhesive between the metallic foils and the plastic films and provide first and second laminates, allowing the adhesive to set until the impervious seal is formed, inserting at least one lithium battery between the first and second laminates interiorly of the continuous bands, the first and second continuous bands facing one another, and sealing the continuous bands all around, to one another, thereby preventing any outside substance from contacting the battery(ies).

Preferably, the adhesive is allowed to set for a period of at least about 7 days at ambient temperature, and any excess adhesive is removed with a suitable solvent.

BRIEF DESCRIPTION OF DRAWINGS

The invention is illustrated by means of the annexed drawings, which are not intended to limit the invention thereto, and in which:

FIG. 7 is a curve representing the cycling efficiency of a lithium battery packaging according to the invention.

DESCRIPTION OF PREFERRED EMBODIMENTS

Figure 1:
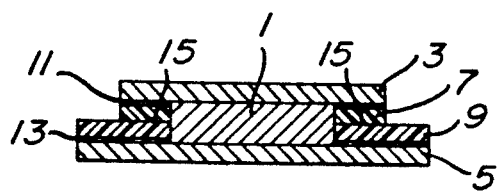
FIG. 1 is a schematic representation of a lithium battery packaging according to the present invention.

With reference to the drawings, more particularly FIG. 1, it will be seen that a device for packaging a lithium battery 1 (schematically illustrated in the drawings it being understood that it contains a lithium anode, a solid polymer electrolyte and a cathode containing $V^6O^{13}$ or $TiS_2$) consists of a metallic foil 3 whose thickness is between 8 and 50μ, another metallic foil 5 which has a slightly larger surface area than foil 3 and continuous bands 7 and 9 of high density polyethylene, such as DuPont HDPE. To prevent any electrical contact between foils 3 and 5 when the device is assembled, the metallic foil 3 and the continuous band 7, have a slightly smaller surface area than the metallic foil 5 and the continuous band 9.

It should be noted that both continuous bands 7 and 9 of high density polyethylene have one surface which is corona treated to provide better adhesion with the metallic foils 3 and 5. Each band 7,9 has its corona treated surface (not shown) facing a respective metallic foil 3,5. The band 7,9 is bonded to metallic foil 3,5 by means of a two part polyester glue such as one which is sold by Morton Thiokol under the trademark ADCOTE to form an impervious seal 11,13 between the band and the metallic foil. With the lithium battery 1 placed inside the packaging, a thermo-seal 15 is formed all around and between the two continuous bands 7 and 9, to produce a perfectly sealed enclosure which prevents any outside substance from contacting the battery 1.

Figure 2:
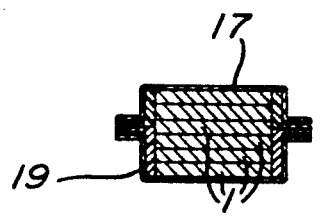
FIG. 2 is an illustration of a packaging with two container like metallic foils.
Figure 3:
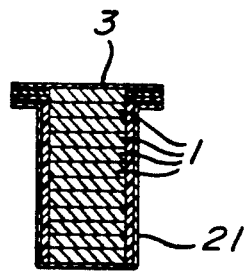
FIG. 3 is an illustration of a packaging with one flat metallic foil and one container like foil.
Figure 4:
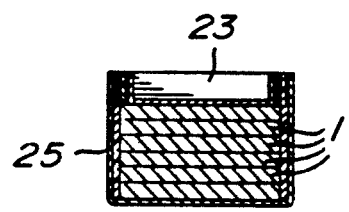
FIG. 4 is an illustration of yet another packaging.
Figure 5:
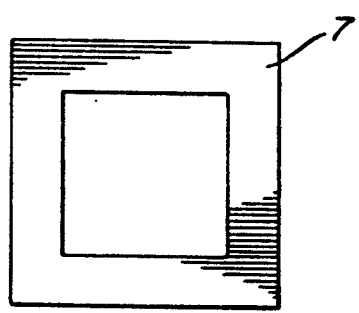
FIG. 5 is a top plan view of an upper continuous band of polyethylene.
Figure 6:
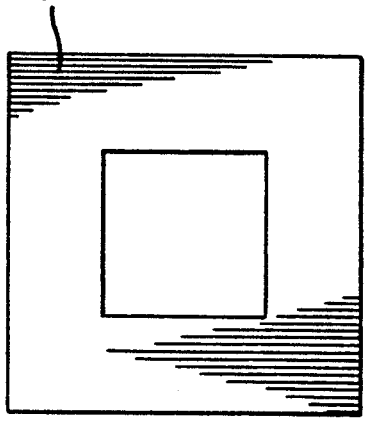
FIG. 6 is a top plan view of a lower continuous larger band of polyethylene.

FIGS. 2, 3 and 4 schematically illustrate the packaging of a plurality of batteries 1 in between two container like metallic foils 17,19 (FIG. 2) between a metallic foil 3 and a container like metallic foil 21 (FIG. 3) and between an inverted container like metallic foil 23 and a container like metallic foil 25 (FIG. 4). Of course, any other form of packaging is within the scope of the present invention, provided it includes the above-mentioned structural characteristics.

It will be obvious to one skilled in the art that the preparation of a battery packaging as illustrated in the drawings can be carried out as outlined above.

The invention will now be illustrated by means of the following examples.

EXAMPLE 1

First method

Two square pieces ($2\frac{1}{4} \times 2\frac{1}{4}''$ and $2\frac{1}{8} \times 2\frac{1}{8}''$ respectively), are cut out of a foil of hardened stainless steel (SS) 304, 12 μm thick (Peckover's shim). Square pieces of similar dimensions are cut out of HDPE polyethylene film, 50 μm thick (DuPont), laminating grade, corona treated on one side. Windows of $1\frac{3}{4} \times 1\frac{3}{4}$ are cut in the center of the polyethylene pieces. A solution of 2-part polyester adhesive, Adcote 548, from Morton-Thiokol is prepared (10 parts of Adcote 548, 1 part of catalyst F and 8 parts of ethyl acetate) and a ½ mil coat of this solution applied to the treated side of the polyethylene gaskets. The coated side is applied to the corresponding SS pieces, nip-laminated at 60° C. and left for 7 days at room temperature for complete curing of the adhesive.

In a glove box, a lithium round cell (1" diameter, 120 μm thick) made up of one polymer electrolyte film, one $V_6O_{13}$ polymer composite positive electrode, one lithium negative electrode and two metal foil current collectors, as described in the European Patent No. 013199 is then placed between the two assembled SS pieces, in their center. These are then centered and heat-sealed with a conventional polyethylene film heat-sealing element, leaving a uniform gap of 1/16" between the two SS pieces. This gap provides ample electrical insulation between the two SS pieces, which now act as external current collectors as well as packaging and protection against atmospheric air and moisture. This packaged cell is subjected to charge-discharge cycling at 60° C. in the ambient laboratory atmosphere of 50% RH for 10 months. After more than 500 cycles completed, the % of utilization of the active materials in the battery is still around 80% (FIG. 7), indeed indicating the absence of migration of air and water vapor through the packaging seal. The small peak after about 150 cycles is an artefact corresponding to the temporary interruption, then reinitiation of the cycling procedure. Attempts to peel-off the packaging apart result in tearing the metallic foil without affecting the seal.

Second method

The same procedure is repeated with pieces of nickel foil, 9 μm thick, instead of stainless steel. The same good sealing properties for the lithium cell are observed, even though some creases are formed on the external surface of the nickel foil, owing to the fact that it is a softer material than stainless steel.

EXAMPLE 2

Two rectangular pieces of 82×52 mm are cut out of the stainless steel foil as in the first example, and polyethylene gaskets of 2 mm are glued on the outside rim of the SS pieces. A rectangular piece of 78×47 mm is cut out of a polypropylene film (25 μm thick) coated with a thin layer of lithium (15 μm thick) as described in U.S. Pat. No. 4,824,746. The lithium layer is transferred to the inside of one of the SS pieces, and the PP film peeled off. Another rectangular piece is cut out of a polypropylene film coated with a layer of positive electrode material (30 μm), itself overcoated with a layer of polymer electrolyte (30 μm), as described in French patent 87 08539, heat-transferred onto the lithium layer, and the PP film peeled off. The two SS pieces are then joined as in the first example, by heat-sealing the 2 mm gaskets, and now act as internal as well as external current collectors, thus optimizing the overall thickness (about 85 μm), surface of active material, weight and energy density of the packaged battery. The same good cycling characteristics as in previous examples are observed.

We claim:

1. Battery packing construction for packaging at least one lithium battery, said lithium battery including a solid polymer electrolyte in electrical contact with an anode of lithium or a lithium alloy and a cathode containing at least one metallic salt, said device comprising
   a first metallic foil having a first continuous band of plastic film bonded thereto by means of a thermoset adhesive along entire peripheral edges of said first metallic foil,
   a second metallic foil having a second continuous band of plastic film bonded thereto by means of a thermoset adhesive along entire peripheral edges of said second metallic foil,
   said first and second metallic foils disposed over one another with the first and second plastic films arranged adjacent one another in facing relationship,
   said lithium battery being sandwiched between said first and said second metallic foils in space inside said first and said second continuous bands of plastic film with the anode in contact with one said metallic foil and the cathode in contact with the other metallic foil,
   said first and second continuous bands of plastic film being imperviously heat-sealed together to prevent any outside substance to contact said battery.

2. Battery packing construction for packaging at least one lithium battery according to claim 1, wherein said metallic foils are made of the same material.

3. Battery packing construction for packaging at least one lithium battery according to claim 2, wherein said material, plain or coated on another metal, is selected from the group consisting of stainless steel, nickel, copper, aluminum, and alloys thereof.

4. Battery packing construction for packaging at least one lithium battery according to claim 3, wherein said metallic foils are made of stainless steel.

5. Battery packing construction for packaging at least one lithium battery according to claim 4, wherein said metallic foils have a thickness between 8 μ and 50 μ.

6. Battery packing construction for packaging at least one lithium battery according to claim 5, wherein said metallic foils are made of stainless steel and have a thickness between 9 μ and 12 μ.

7. Battery packing construction for packaging at least one lithium battery according to claim 3, wherein said metallic foils are made of nickel and have a thickness of about 9 μ.

8. Battery packing construction for packaging at least one lithium battery according to claim 3, wherein said metallic foils are made of aluminum and have a thickness of about 25 μ.

9. Battery packing construction for packaging at least one lithium battery according to claim 1, wherein said first and said second metallic foils are in the form of flat rectangular foils.

10. Battery packing construction for packaging at least one lithium battery according to claim 1, wherein said first and said second metallic foils are in the form of flat round foils.

11. Battery packing construction for packaging a plurality of lithium batteries according to claim 1, wherein at least said second metallic foil is shaped as a container with a peripheral flange at open part thereof, said second continuous band adhesively bonded to said entire peripheral flange.

12. Battery packing construction for packaging a plurality of lithium batteries according to claim 11, wherein both said first and second metallic foils are shaped as a container with a peripheral flange.

13. Battery packing construction for packaging a plurality of lithium batteries according to claim 11, wherein said first metallic foil is shaped as a shallow container with a peripheral first collar, said second metallic foil is shaped as a deeper container with a longer second collar, said deeper container to receive said shallow container in upper portion thereof, said first continuous band being adhesively bonded along upper edge outside said first collar and said second continuous band being adhesively bonded along upper edge inside said second collar.

14. Battery packing construction for packaging at least one lithium battery according to claim 1, wherein said first and said second continuous bands of plastic film are made of laminating grade polyethylene.

15. Battery packing construction for packaging at least one lithium battery according to claim 14, wherein said polyethylene is high density polyethylene.

16. Battery packing construction for packaging at least one lithium battery according to claim 14, wherein said film of laminating grade polyethylene is corona treated on one surface thereof.

17. Battery packing construction for packaging at least one lithium battery according to claim 14, wherein said polyethylene film has a thickness between about 25 μ and 100 μ.

18. Battery packing construction for packaging at least one lithium battery according to claim 17, wherein said thickness is about 50 μ.

19. Battery packing construction for packaging at least one lithium battery according to claim 16, wherein said polyethylene film is bonded to said metallic foil by means of a two part polyester glue.

20. Battery packing construction for packaging at least one lithium battery according to claim 19, wherein the adhesive bond has a thickness of about 5 $\mu$ to 25 $\mu$ after setting.

21. Battery packing construction for packaging at least one lithium battery according to claim 20, wherein said thickness is about 10 $\mu$.

22. Battery packing construction for packaging at least one lithium battery according to claim 19, wherein the corona treated surface faces the corresponding metallic foil, and the adhesive bond is formed between said corona treated surface and said metallic foil.

23. Battery packing construction for packaging at least one lithium battery according to claim 1, wherein said first metallic foil and said first continuous band have a slightly smaller surface area than said second metallic foil and said second continuous band so as to prevent any possible electrical contact between said first and said second metallic foils when said device is assembled.

* * * * *